(12) United States Patent
Valentine et al.

(10) Patent No.: US 6,353,607 B1
(45) Date of Patent: Mar. 5, 2002

(54) IP BASE GSM INTER-MSC HANDOVER

(75) Inventors: Eric Valentine; Subhankar Ray, both of Plano, TX (US)

(73) Assignee: Ericsson Inc., Richardson, TX (US)

( * ) Notice: Subject to any disclaimer, the term of this patent is extended or adjusted under 35 U.S.C. 154(b) by 0 days.

(21) Appl. No.: 09/196,978

(22) Filed: Nov. 20, 1998

(51) Int. Cl.[7] .................................................. H04J 3/24
(52) U.S. Cl. ..................................... 370/349; 370/352
(58) Field of Search ................................ 370/352, 355, 370/349, 321, 338, 347; 455/426, 456, 433, 461

(56) References Cited

U.S. PATENT DOCUMENTS

| | | | | |
|---|---|---|---|---|
| 5,590,133 A | * | 12/1996 | Billstrom et al. | 370/349 |
| 5,896,369 A | * | 4/1999 | Warsta et al. | 370/338 |
| 5,949,775 A | * | 9/1999 | Rautila et al. | 370/338 |
| 5,956,331 A | * | 9/1999 | Rautila et al. | 370/338 |
| 6,101,387 A | * | 8/2000 | Granberg et al. | 455/433 |
| 6,119,012 A | * | 9/2000 | Amirijoo | 455/456 |
| 6,128,503 A | * | 10/2000 | Granberg et al. | 455/461 |

FOREIGN PATENT DOCUMENTS

WO    WO97/16916    9/1997

OTHER PUBLICATIONS

Mouly M et al: "The GSM System for Mobile Communications. Radio Resource Management" 1992, Fr, Lassay–Les–Chateaux, Europe Media, pp. 308–430 XP000860006.

* cited by examiner

*Primary Examiner*—Salvatore Cangialosi
(74) *Attorney, Agent, or Firm*—Arthur I. Navarro

(57) ABSTRACT

A wireless communications system and methods having at least two interconnected mobile switching centers (12, 14), each coupled to a corresponding media gateway (74, 76) and to an IP network (40) reduces the use of circuit connections (32) during inter-MSCs handover. Speech packets (84) are transmitted between a first MSC (12) and a second MSC (14) over an IP network (40) rather than over the circuit connections (32). An IP address (80) is used as a transaction identifier which can include the IP address, socket, and/or session number associated with the media gateway 74 for a call. The anchor MSC (12) sends the IP network address (80) that is currently being used for the call to the non-anchor MSC (14).

19 Claims, 5 Drawing Sheets

US 6,353,607 B1

IP BASE GSM INTER-MSC HANDOVER

TECHNICAL FIELD

The invention relates generally to cellular telephone communications, and more particularly to a system and related methods of reducing the use of circuit connections between Mobile Switching Centers (MSCs) in a wireless communication network.

BACKGROUND OF THE INVENTION

The widespread use of wireless phones has increased the need for greater bandwidth on the cellular network. In general, cellular networks are arranged as clusters of cells, each cell containing one or more base stations. Call routing and handling between cells in a cluster are controlled by Mobile Switching Centers (MSCs). Between MSCs, circuit connections provide the handover mechanism that service calls as users roam from one service zone to another.

With the increasing use of cellular telephones, the inter-MSC circuit connections become overloaded during periods of high call volume and increased roaming. The result is delayed transmission time, and/or the inability to obtain connections, particularly during peak times, such as at the end of the work day. Typically, inter-MSC circuit connections are leased from a third party who maintains and operates them for cellular providers on a charge basis. Thus, the use of circuit connections can be costly.

At the same time, the Internet has become a viable carrier of voice signal data. The Internet comprises a worldwide network of communications equipment and service providers which use a common protocol to send and receive information. Point-to-point signaling is achieved through a large network of routers, servers, gateways and other communications devices which form the Internet infrastructure. The use of the Internet for transmitting voice data is often referred to as Voice Over the Internet (VON). An advantage of sending voice data over the Internet is that transmission may be more cost effective than over the traditional telephone system.

A means of reducing or eliminating the use of the circuit connections utilized by the mobile switching centers would be advantageous.

SUMMARY OF THE INVENTION

The present invention integrates wireless communications system hand-over mechanisms within the infrastructure of an IP Network, taking advantage of faster transmission times and lowering the use of the inter-MSC circuit connections.

According to one embodiment, disclosed is a method of reducing the use of circuit connections between two MSCs comprising the steps of sending an IP network address from a first MSCs to the second MSC; transmitting a control message from first MSC to its corresponding media gateway; transmitting a request to the media gateway associated with the second MSC to redirect speech packets having a predetermined address to the IP network; and transmitting said speech packets over said IP network.

An alternative method of reducing the use of circuit connections between the MSCs is also disclosed. The method comprises the steps of sending a request for handover from a first MSCs to a second MSC; transmitting a request for an IP network address in a control message from the second MSC to its corresponding media gateway; transmitting the IP network address to the first MSC from the second MSC; transmitting a control message from said first MSC to the media gateway associated with the first MSC to redirect speech packets to the IP network; and transmitting the speech packets over the IP network to the IP network address.

Further disclosed is a wireless communications system with reduced use of circuit connections between MSCs comprising an Internet Protocol (IP) network and at least two interconnected MSCs coupled to the IP network. A corresponding media gateway is coupled to each of MSCs and as well as to the IP network. The media gateway is configured to recognize IP network addresses and receiving control messages that redirect IP packets to the IP network using the IP network address.

BRIEF DESCRIPTION OF THE DRAWINGS

The above features of the present invention will be more clearly understood from consideration of the following detailed description taken in conjunction with the appended drawings in which.

Corresponding numerals and symbols in the different figures refer to corresponding parts unless otherwise indicated.

DETAILED DESCRIPTION OF PREFERRED EMBODIMENTS

Figure 1:
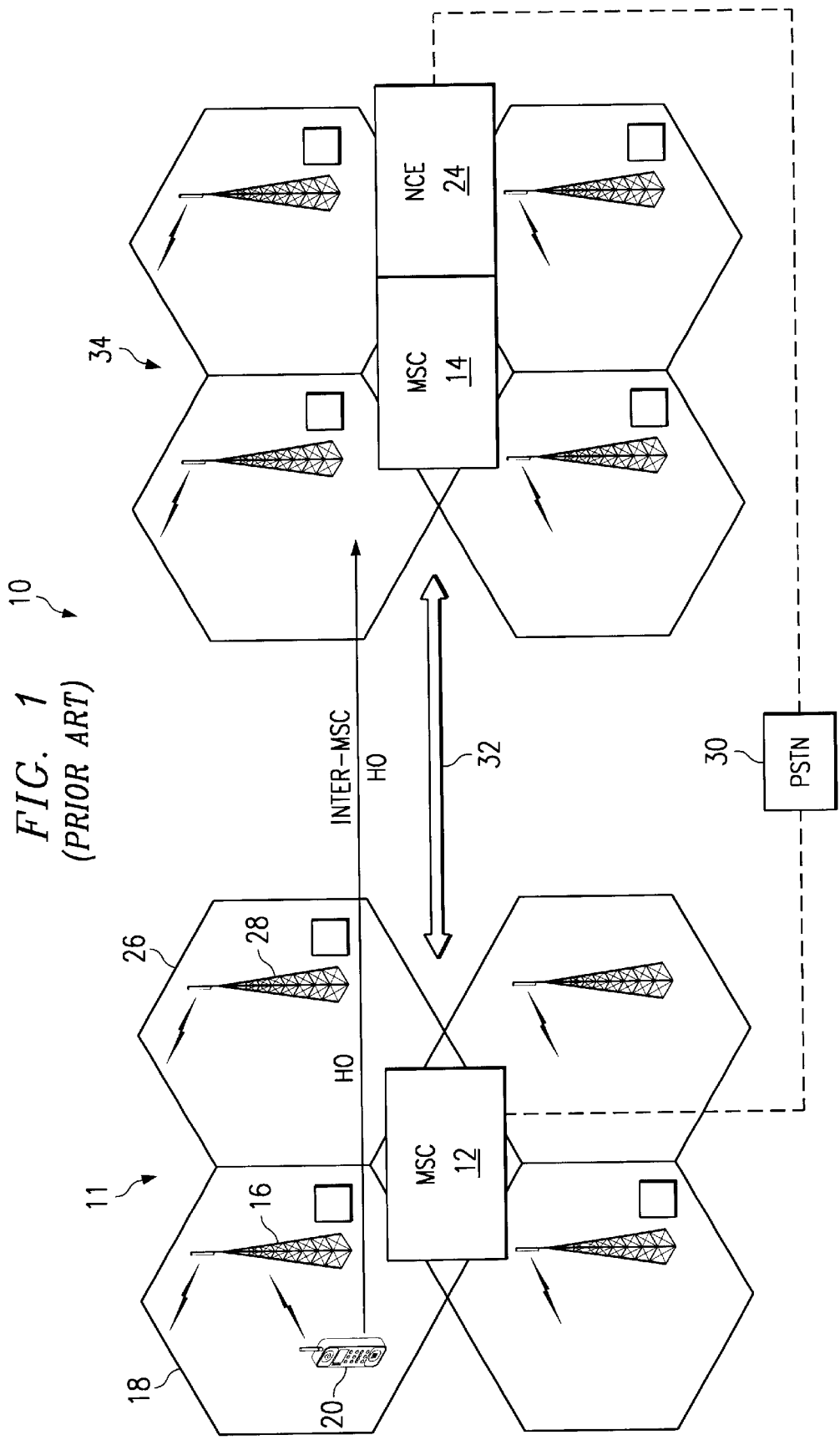
FIG. 1 is a diagram of a typical wireless communications network.

Referring to FIG. 1, therein is shown the general system architecture of a typical cellular network 10. The cellular network 10 includes a number of cells which comprise a clusters 11 and 34, each cluster indicated by the grouped set of hexagons. Each cluster 11 and 34 in the network 10 is controlled by corresponding Mobile Switching Center (MSC) 12 and 14, respectively. In particular, the cells of cluster 11 would be controlled by MSC 12, while those in cluster 34 are controlled by MSC 14.

Within cluster 11, the MSC 12 controls the base station 16 within a particular cell 18 and channels utilized by a mobile hand set 20. A national carrier exchange 24 provides the gateway to the national fixed Public Switched Telephone Network (PSTN) 30 and handles the connections on behalf of the national communication systems. Usually, the national carrier exchange 24 is integrated within the MSC 14.

Assuming the hand set 20 is active corresponding to when the hand set 20 is switched on, the hand set 20 registers with the appropriate base station 16. Depending on the location of the hand set 20 within the system 10, its position is stored at the "anchor" or controlling MSC 12. When a call is set-up (e.g. when a user makes a call), the base station 16 monitors the quality of the signal for the duration of the call, and reports that to the anchor MSC 12 which, in turn, makes decisions concerning the routing and handling of the call.

When the hand set 20 moves from one cell 18 to another cell 26 within the same cluster 11, the base station 16 detects the move from the signal power levels and inform the anchor MSC 12. The anchor MSC 12 will then switch control of the call to the base station 28 of the new cell 26, where the hand set 20 is now located. This process of switching is known as "handover" (HO). Typically, a handover takes up to 400 ms, which is not noticeable for voice transmission.

Should the hand set 20 travel to a cluster 32 not under the control of the anchor MSC 12, the call is transferred to a non-anchor MSC 14 controlling the cluster 32 in which the hand set 20 is now located. This often referred to as "inter-MSC" handover. The circuit connection 32 between the MSCs 12 and 14 provides a signal pathway utilized by the MSCs 12 and 14 during inter-MSC handover. Circuit connection 32 may be implemented as switches, channels or other similar signaling pathway.

With the increasing use of cellular telephones, the circuit connection 32 may become overloaded in the network 10 due to high volume. The circuit connection 32 is often leased from a third party long distance carrier, which can be expensive. Thus, a means of reducing or eliminating the use of circuit connection 32 utilized by the MSCs 12 and 14 during inter-MSC handover would be advantageous. In particular, reducing the use of the circuit connection 32 will free up capacity on the network 10 and allow an increased number of cellular phone calls to be placed and serviced by the network 10.

The present invention provides an alternate transport medium for use between the MSCs 12 and 14 of a typical cellular communications network 10. In particular, the invention contemplates the use of an network utilizing Internet Protocol (IP) as the transport medium between MSCs 12 and 14 during inter-MSC handover. Due to lower regulatory and technical requirements imposed on IP networks as compared with circuit switched networks, IP networks are relatively inexpensive to use, maintain, and update.

Figure 2:
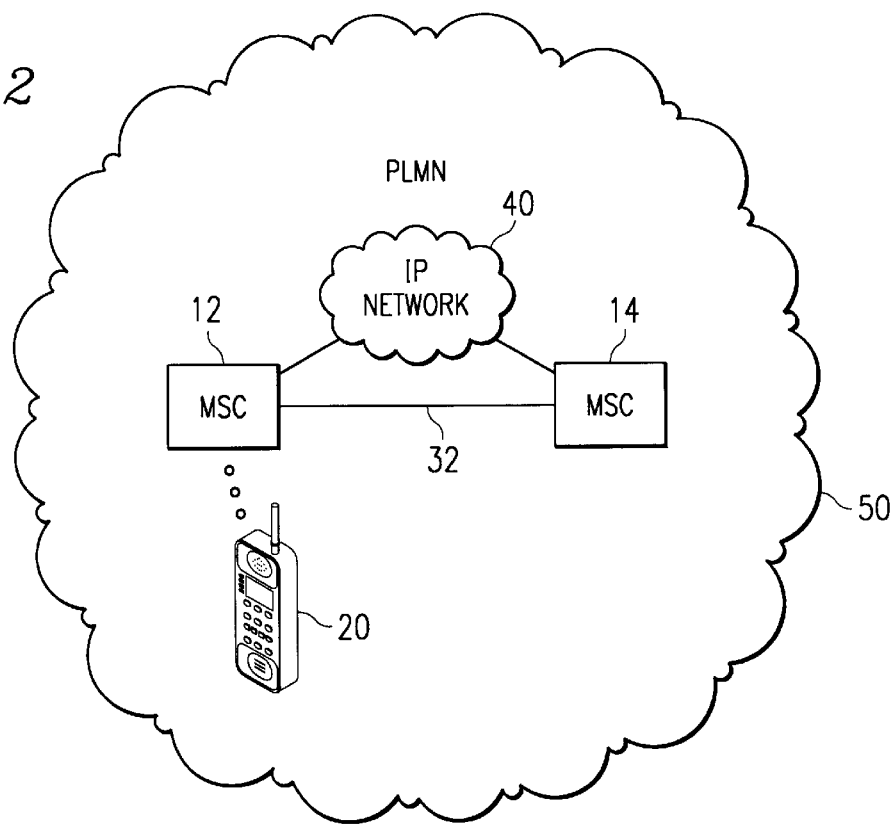
FIG. 2 is a high level view of a Public Land Mobile Network (PLMN) including two mobile switching centers according to one embodiment.

Referring to FIG. 2, therein is illustrated a high level view of Public Land Mobile Network (PLMN) 50 which spans the entire area serviced by the MSCs 12 and 14. Typically, the PLMN 50 would include many other MSCs for a typical cellular network. A user of a mobile handset 20 may place a cellular call serviced by the anchor MSC 12 controlling the cluster 11 in which the handset 20 is located. Currently, MSC 12 uses circuit connection 32 for inter-MSC handover when mobile handset 20 travels to a cluster controlled by non-anchor MSC 14. As shown, the MSCs 12 and 14 are coupled to the IP network 40. The fact that the MSCs 12 and 14 are coupled to the IP network 40 permits the IP network 40 to be utilized during inter-MSC handover and reduces the use of circuit connection 32.

Figure 3:
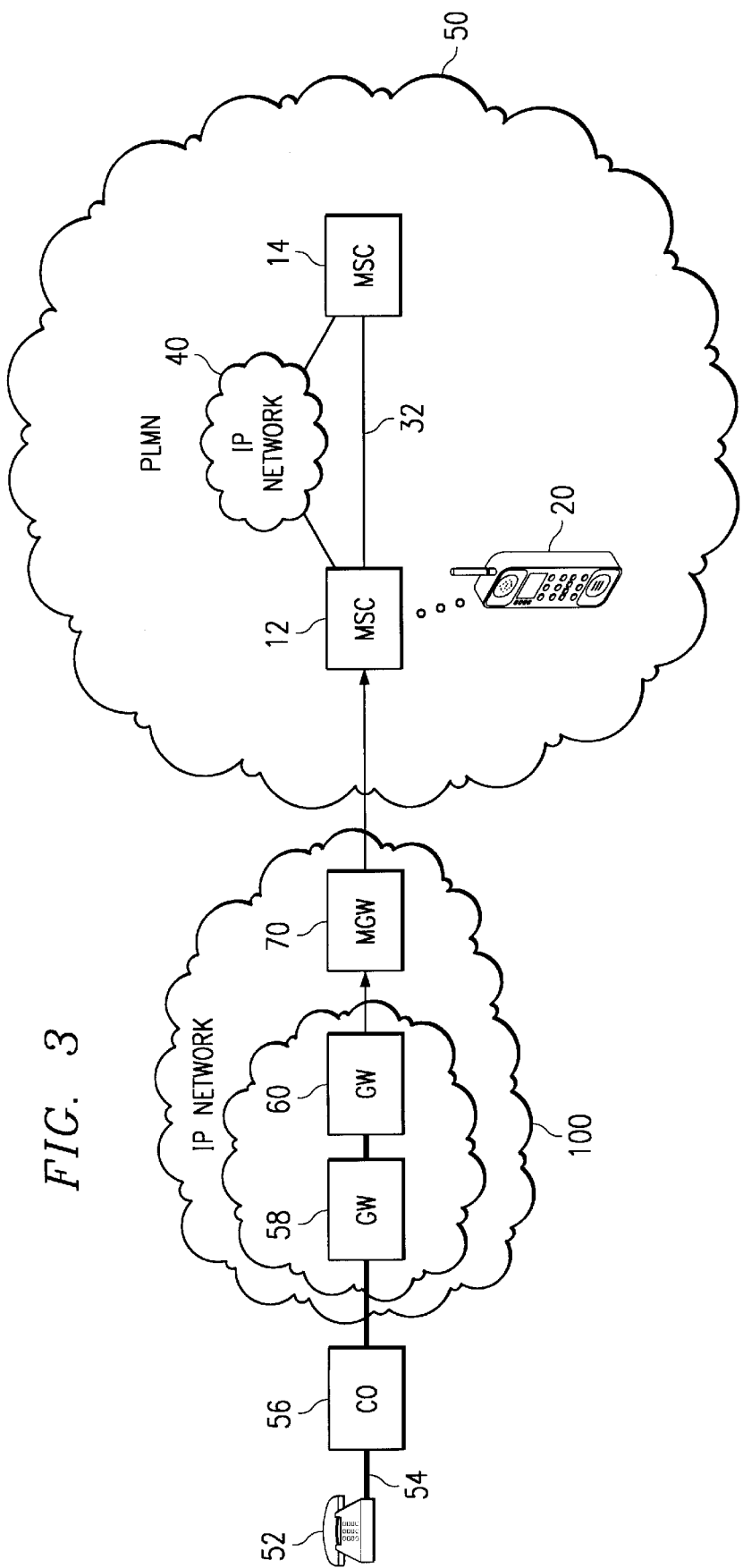
FIG. 3 illustrates an alternative embodiment of a PLMN where the media gateway resides within the IP network.

FIG. 3 illustrates a second variation of the intention wherein the PLMN 50 is coupled to a second IP network 100 through a media gateway 70. Preferably, the media gateway 70 is capable of transporting voice data. The IP network 100 can be any network based on the Internet Protocol (IP). While the Internet can be utilized as the IP network 100, in all likelihood the Internet would not be used since it would be difficult to guarantee the quality of service. Thus, according to various embodiments, the IP network 100 can be a Wide Area Network (WAN) or Metropolitan Area Network (MAN) which can be controlled by an independent third party operator. The advantage of using the IP network 100 is the reduced cost due to loose regulatory and technical overhead involved with transmitting information employing IP versus circuit switched technology.

As shown, a Plain Old Telephone System (POTS) 52 is coupled to a central office facility 56 through connection 54. Typically, the connection 54 is twisted pair copper wiring of the type found in many PSTN installations. Calls placed from the POTS 52 are received at the central office 56 and routed to the IP network 100. The central office 56 may employ a linecard for this purpose which would convert analog signals from the POTS 52 to equivalent digital data sequences using well known conversion and sampling the algorithms.

The POTS 52 represents a wide array of contemplated communications devices residing at a subscriber location. Such equipment may include a traditional telephone system, modem, facsimile or other similar device operating within the POTS bandwidth of approximately 300 to 3.4 kz. It should be understood however, that other communications devices and protocols may be employed from the subscriber location to generate the voice data that would eventually reach the PLMN 50. For example, the newly developed assortment of communications equipment and devices compliant with the xDSL standard may be employed at the subscriber location. With such devices, the connection 54 between the POTS 52 and the central office 56 may be digital and carry a digital signal routed to the IP network 100.

The signal from POTS 52 would be converted into packetized speech before reaching the IP network 100. This is typical of a voice over IP application wherein the IP network 100 is used to bypass traditional long distance telephone facilities. Thus, the IP network 100 is equipped with a media gateway 70 that allows the conversion from packetized speech to circuit speech suitable for the PLMN 50. The gateway elements 58 and 60 represent the point-to-point path utilized to transfer the packetized speech data within the IP network 100 to the media gateway 70.

Thus calls received by the IP network 100 reach the PLMN 50. As shown, one of the gateway elements 60 is communicably coupled to the media gateway 70 which directs its output as speech data to the MSC 12. Other means of directing call data to the MSC 12 may be employed.

Figure 4:
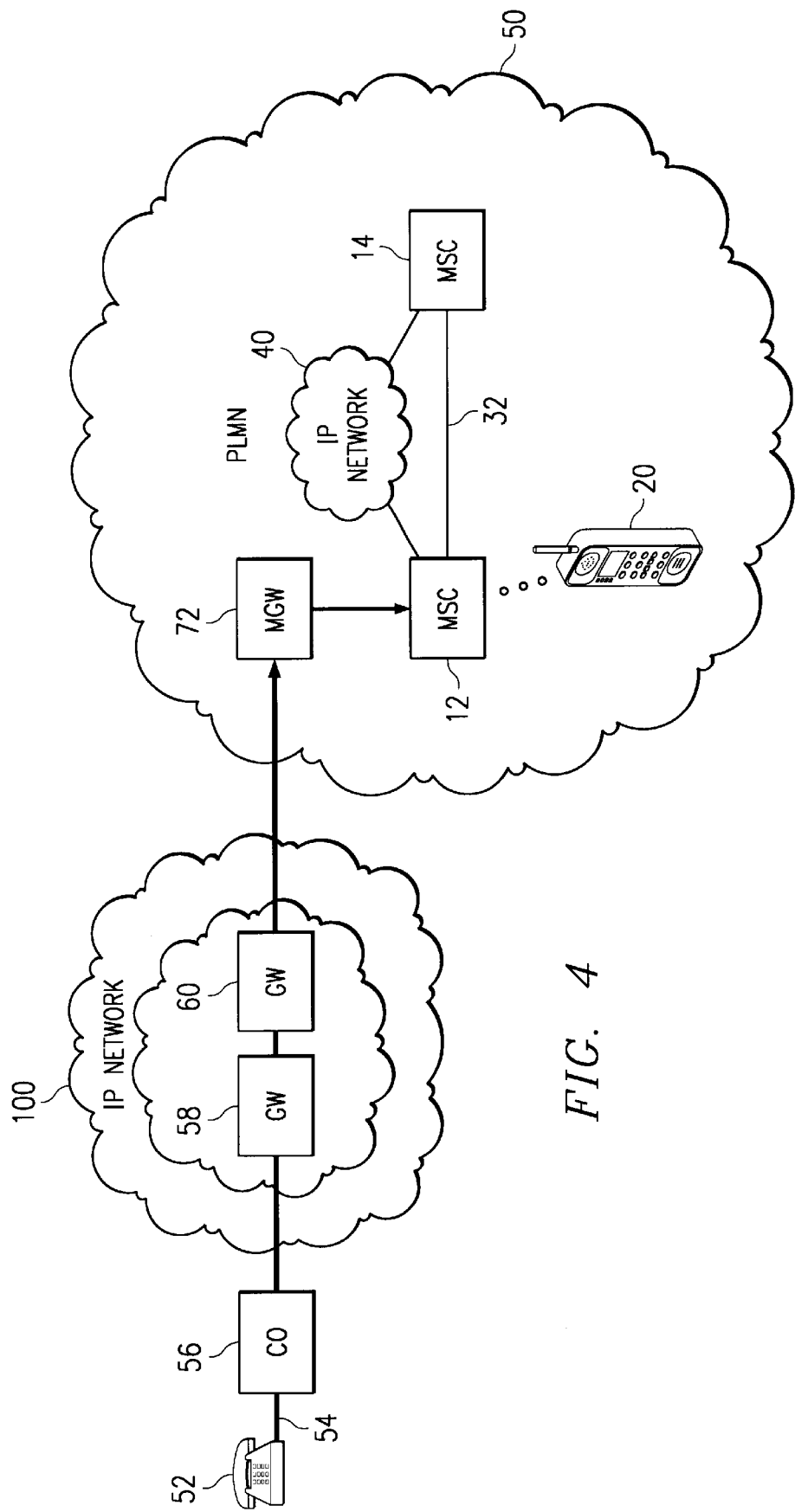
FIG. 4 illustrates an alternative embodiment of a PLMN where the media gateway resides in PLMN.
Figure 6:
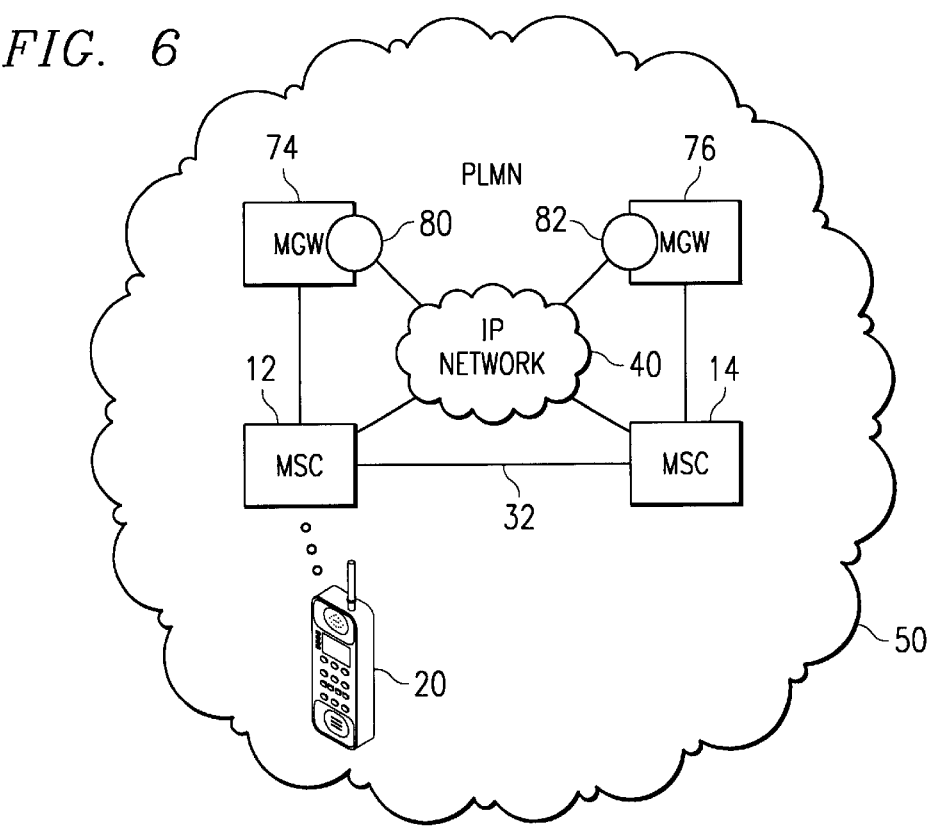
FIG. 6 shows an IP network address sent to and recognized by media gateway.

An alternative arrangement of the media gateway function 70 is illustrated in FIG. 4 wherein a media gateway 72 is contained within the service zone of the PLMN 50. In this case depacketization occurs in the PLMN 50 since the media gateway 72 located at an MSC site. It should be understood that other methods of converting packetized speech data suitable for the PLMN 50 may be devised.

Figure 5:
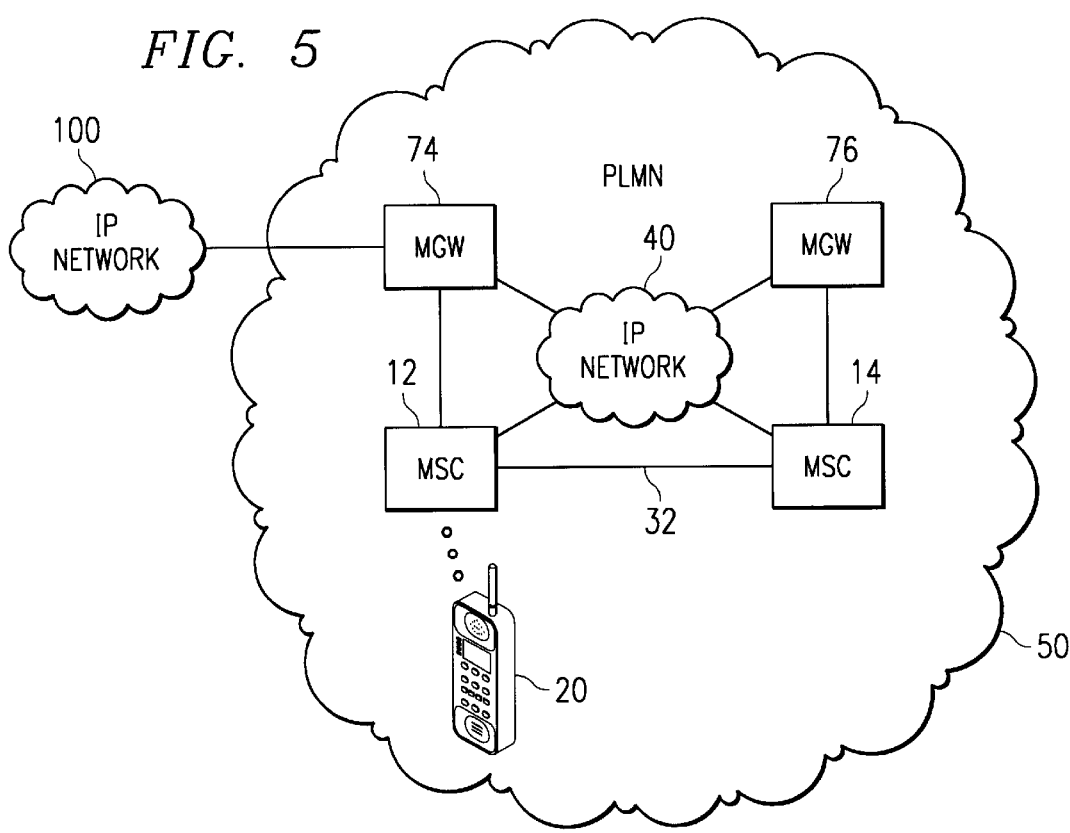
FIG. 5 illustrates a preferred embodiment of the present invention where each MSC is coupled to a corresponding media gateway in the PLMN.

Turning to FIG. 5, an embodiment of a communications system according to the invention is shown having MSCs 12 and 14 coupled to corresponding media gateways 74 and 76 within PLMN 50. The MSCs 12 and 14 and media gateways 74 and 76 are coupled to the IP network 40. When a user of mobile handset 20 places a call, the call is connected to anchor MSC 12. As the hand set user moves into the operating area of the non-anchor MSC 14, the inter-MSC handover occurs over the IP network 40 rather than through circuit connection 32. The fact that inter-MSC handover occurs over the IP network 40 reduces the use of the circuit connection 32.

In general, handover occurs through the communication of MSCs 12 and 14 with their corresponding media gateways 74 and 76. The fact that IP network 40 is utilized means that more efficient use of the cellular network can be achieved since MSCs 12 and 14 are connected to the same IP network 40. Thus, voice data packets remain packetized as long as possible over a less expensive connection medium.

Two mechanisms for by-passing the circuit connections 32 between MSC 12 and 14 will be described. First, a method of communicating IP address information between the MSCs 12, 14 and the media gateways 74, 76 is contemplated. When the MSC 12 anchors a call, a call is initiated through handset 20 having an associated Visitor Location Register (VLR). The anchor MSC 12 transmits a network IP address 80 to its corresponding media gateway 74. The IP address 80 may be used as a transaction identifier which can include the IP address, socket, and/or session number associated with the media gateway 74 for that call, for example. Thus, the anchor MSC 12 sends the IP network address 80 that is currently being used for the call to the non-anchor MSC 14. The IP network address 80 is in effect being used as a transaction identifier, but may actually be a socket identifier or other identifier that will enable the media gateway 74 at the anchor MSC 12 to unambiguously identify the call.

Figure 7:
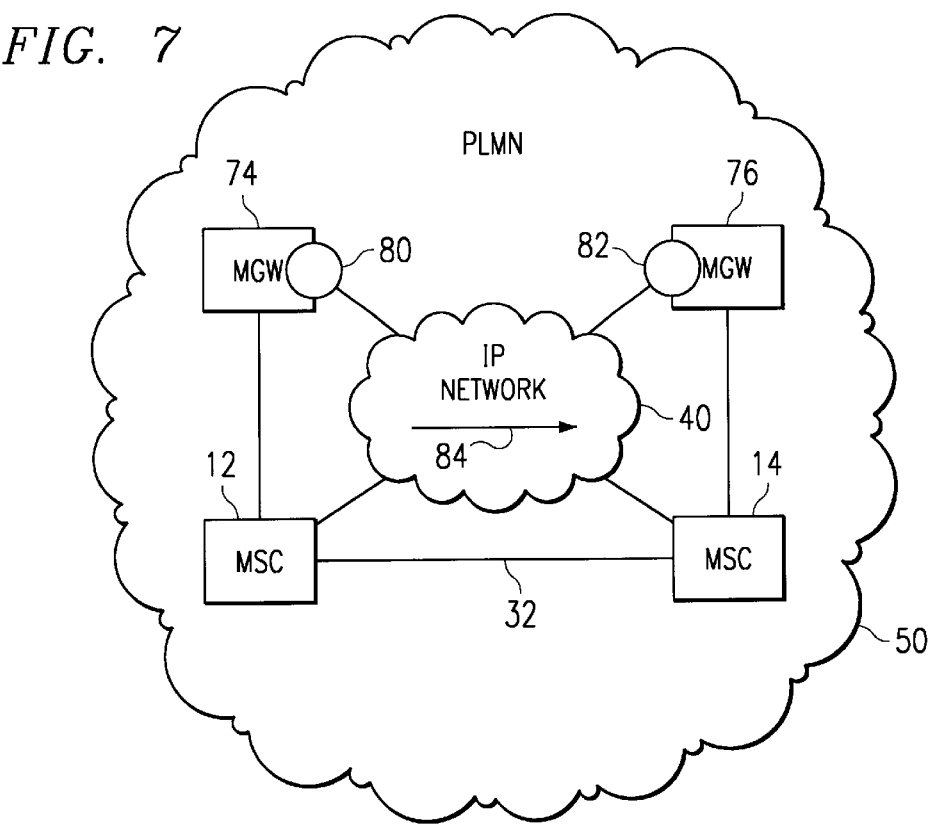
FIG. 7 illustrates a voice message being sent from a first MSC over an IP network to a second MSC in accordance with the present invention.

Next, the IP network address 80 can be transmitted to the non-anchor MSC 14 along with other information as part of the inter-MSC handover procedure. The non-anchor MSC 14 communicates with its associated media gateway 76 through a control message 82 to contact the media gateway 74 with the given IP network address 80 and request redirection of the speech packets. The media gateway 76 does this with a control message 82 across the IP network 40. The media gateway 74 at the anchor MSC 12 responds with an acknowledgment to the media gateway 76 at the non-anchor MSC 16 which then informs the MSC 14. The handover is then performed by transmitting speech packets 84 containing a voice message over the IP network 40 from MSC 12 to MSC 14 as shown in FIG. 7.

The IP address 80 can be sent from the anchor MSC 12 to the non-anchor MSC 14 in a Mobile Application Part (MAP) message. As is known to those of ordinary skill, MAP refers to a control protocol used between nodes in the GSM network. There are existing MAP messages used for inter-MSC handover that go between the anchor MSC 12 and the non-anchor MSC 14. Thus, the invention contemplates adding the IP address information to these existing MAP messages.

An alternate method of the present invention is based upon receiving the handover request for the non-anchor MSC 14 to use the control message 82 to query its associated media gateway 76 for an IP network address 80. The IP network address 80 is then returned to the anchor MSC 12 which forwards a control message 82 to its media gateway 74. The media gateway 74 then reroutes speech packets which contain the phone call information to the specified IP network address 80.

The novel method and system of reducing the use of circuit connection 32 between MSCs 12 and 14 of a wireless communications system provides considerable transmission efficiency gains. Use of circuit connection 32 is reduced or eliminated with the present invention, providing more bandwidth on the network. Another advantage is cost savings to cellular phone service providers, who now require less leased time on trunks used to carry circuit connection 32. Yet another advantage of the present invention includes keeping voice data packets packetized as long as possible over a less expensive connection medium of an IP network. MSCs connected to each other by IP networks have increased efficiency by utilizing the IP network for handovers, rather than circuit connections.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. It is therefore intended that the appended claims encompass any such modifications or embodiments.

What is claimed is:

1. In a wireless communications system comprising first and second interconnected mobile switching centers, an internet protocol network, a first media gateway and a second media gateway, the first and second mobile switching centers coupled to the first and second media gateways, respectively, and wherein the first and second mobile switching centers are further coupled to the internet protocol network, a method of reducing the use of circuit connections between the mobile switching centers comprising the steps of:

a) the first mobile switching center transmitting a transaction identifier to both the first media gateway and second mobile switching center;

b) the second mobile switching center transmitting a control message to the second media gateway requesting a redirection of speech packets over the internet protocol network;

c) the second media gateway transmitting the control message to the first media gateway requesting a redirection of speech packets having a predetermined address to said internet protocol network; and d) transmitting said speech packets over said internet protocol network using said transaction identifier thereby reducing the use of circuit connections between said first and second interconnected mobile switching centers.

2. The method of claim 1 wherein said step of transmitting a transaction identifier comprises the step of transmitting an internet protocol address.

3. The method of claim 2 wherein the step of transmitting said internet protocol network address is done using a mobile applications protocol message.

4. The method of claim 1 wherein said first mobile switching center is an anchor mobile switching center.

5. The method of claim 1 wherein said second mobile switching center is a non-anchor mobile switching center.

6. The method of claim 2 wherein said step of transmitting an internet protocol address comprises the step of transmitting an internet protocol address associated with said first mobile switching center.

7. The method of claim 2 wherein said step of transmitting an internet protocol network address comprises the step of transmitting a socket identifier associated with said first mobile switching center.

8. The method of claim 2 wherein said step of transmitting an internet protocol address comprises the step of transmitting an internet protocol plus port number.

9. In a wireless communications system comprising interconnected mobile switching centers, and internet protocol network, a first media gateway and a second media gateway, with first and second mobile switching centers coupled to said first and second media gateways, respectively, and wherein said first and second mobile switching centers are further coupled to said internet protocol network, a method of reducing the use of circuit connections during intermobile switching center handover comprising the steps of:

a) initiating a handover from said first mobile switching center to said second mobile switching center;

c) transmitting an internet protocol address to said first mobile switching center, the internet protocol address to be used as a transaction identifier for communicating between said first and second mobile switching centers;

d) transmitting a control message from said first mobile switching center to said first media gateway, the control message causing a redirection of speech packets to said internet protocol network, the control message transmitted to said second gateway over said internet protocol network; and e) transmitting said speech packets over said internet protocol network using said internet protocol address.

10. The method of claim 9 wherein said first mobile switching center is an anchor mobile switching center.

11. The method of claim 9 wherein said second mobile switching center is a non-anchor mobile switching center.

12. The method of claim 9 wherein said step of transmitting said internet protocol address comprises the step of transmitting a socket identifier associated with said first mobile switching center.

13. The method of claim 9 wherein said step of transmitting said internet protocol address comprises the step of transmitting an internet protocol plus port number.

14. A wireless communication system comprising;

an internet protocol network;

at least two interconnected mobile switching centers coupled to said internet protocol network;

first and second media gateways communicably coupled to each of said mobile switching centers and said internet protocol network, said first media gateways capable of recognizing an internet protocol address, said second media gateway capable of receiving a control message requesting redirection of data to said internet protocol network;

wherein data is transmittable between said interconnected mobile switching centers through said internet protocol network following the transmission of an internet protocol address transmitted to said first media gateway and the transmission of a control message to said second media gateway, thereby reducing the use of circuit connections between said mobile switching centers.

15. The wireless communication system of claim 14 wherein said internet protocol address comprises a socket identifier.

16. The wireless communication system of claim 14 wherein said internet protocol address comprises an internet protocol port number.

17. The wireless communication system of claim 14 wherein one of said mobile switching centers comprises an anchor mobile switching center.

18. The wireless communication system of claim 14 wherein said internet protocol network is selected from the group consisting of:

a local area network, a wide area network, and a metropolitan area network.

19. The wireless communications system of claim 14 wherein said first and second media gateways reside in a public land mobile network.

* * * * *